United States Patent [19]

Bernacki

[11] Patent Number: 5,696,589
[45] Date of Patent: Dec. 9, 1997

[54] OPTICAL CALIPER WITH COMPENSATION FOR SPECIMEN DEFLECTION AND METHOD

[75] Inventor: Bruce E. Bernacki, Knoxville, Tenn.

[73] Assignee: Lockheed Martin Energy Systems, Inc., Oak Ridge, Tenn.

[21] Appl. No.: 650,674

[22] Filed: May 20, 1996

[51] Int. Cl.$^6$ ........................................................ G01B 11/06
[52] U.S. Cl. .................... 356/381; 250/559.27; 250/201.4
[58] Field of Search ................................. 356/381, 382, 356/376; 250/559.27, 559.28, 201.4

[56] References Cited

FOREIGN PATENT DOCUMENTS

| 61-17905 | 1/1986 | Japan | 356/381 |
| 3-118407 | 5/1991 | Japan | 356/381 |

OTHER PUBLICATIONS

"Evaluation of a commercial microtopography sensor", In-Process Optical Metrology for Precision Machning, Proc. Soc. Photo. Instrum. Eng. vol. 802 (1987) pp. 165–169.

"Optical Displacement Sensors: H3065 Series", Hamamatsu Technical Data Sheet, Cat. No. KACC1003E01, Hamamatsu Corp. Bridgewater, NJ (1991).

"Contact and Noncontact Profilers", Optical Shop Testing, 2nd ed., K. Creath, et al, Wiley & Sons, Inc, (1992) pp. 696–714.

"Dynamically Focusing Electro-optical Sensor-System for Microprofilometry" Soc. Photo. Instrum. Eng. vol. 802 (1987) In-Process Optical Metrology for Precision Machining, pp. 170–173.

Primary Examiner—F. L. Evans
Attorney, Agent, or Firm—Earl L. Larcher; James M. Spicer

[57] ABSTRACT

An optical non-contact profilometry system and method provided by an optical caliper with matched optical sensors that are arranged conjugate to each other so that the surface profile and thickness of an article can be measured without using a fixed reference surface and while permitting the article to deflect in space within the acquisition range of the optical sensors. The output signals from the two optical sensors are algebraically added to compensate for any such deflection of the article and provide a so compensated signal, the balance and sign of which provides a measurement of the actual thickness of the article at the optical sensors.

7 Claims, 2 Drawing Sheets

OPTICAL CALIPER WITH COMPENSATION FOR SPECIMEN DEFLECTION AND METHOD

This invention was made with the support of the United States Government under contract No. DE-AC05-84OR21400 awarded by the U.S. Department of Energy. The United States Government has certain rights in this invention.

BACKGROUND OF THE INVENTION

The present invention relates generally to optically measuring the surface profile and/or thickness of a product or specimen while compensating for any deflection of the specimen relative to the optical sensors being used for the measurement, and more particularly to an optical caliper formed of a differential conjugate arrangement of optical sensors for effecting such measurements of the specimen.

In various manufacturing processes such as in the production of work products in a rectangular form such as web or sheet stock or in a cylindrical form such as wire or tubing wherein the product is defined by an elongated body having spaced apart oppositely facing and essentially parallel surface regions, the measurement and monitoring of changes in the surface profile, and in the absolute and local thickness of the work product are of significant importance in achieving desirable product quality and manufacturing control. For example, in rolling mills used for producing sheet stock of various metals and alloys the thickness measurement of the work product or specimen thereof especially in real time is needed for process control. The nominal thickness of the product must be at least periodically measured and continuously monitored so as to assure that the thickness of the product remains within selected parameters while surface imperfections such as roughness or step discontinuities are within the selected control range. Often, in the production of metal sheet stock, the smallest features to be resolved by the measuring mechanism are in the range of about 2.5 micrometers ($\mu$m) even with specimens of several millimeters in thickness.

The measurement of work products such as sheet stock described above as well as other articles such as those produced by other techniques such as machining, extruding, and the like have been previously provided by using both surface contact devices such as linear voltage displacement transducers (LVDTs) and non-contact devices such as interferometers and optical sensors using auto-focus or triangulation techniques.

The LVDTs provide precision measurements of the thickness of the article or specimen but must require contact with the surface of the specimen to effect the measurement. The LVDTs also have a relatively limited dynamic range and must employ a fixed reference surface in order to accurately provide the desired thickness information.

Non-contact surface profilometry achieved by using interferometers involve phase-shifting techniques provide accuracies up to about $\lambda/100$. The dynamic range of an interferometer in a typical application is limited to about several wave lengths due to sampling limitations of the specimen fringes so as to require the use of elaborate phase-unwrapping algorithms to track phase shifts greater than about $2\pi$. These algorithms are based on the premise that the specimen surfaces being measured are smoothly varying, as well as the first derivatives of the surface shape. Thus, interferometric methods cannot accurately measure a 1 mm step and then measure height changes of about 2–5 $\mu$m and cannot be easily used with a surface of poor optical quality.

More recently, articles such as the measurement of surface profiles and cross-sectional thicknesses of various articles or specimens have specular or diffuse surfaces by employing optical auto-focus sensors and optical triangulation sensors instead of LVDTs and interferometric techniques. As a result, absolute thicknesses and changing surface profiles due to steps or roughness associated with such articles can be accurately measured over a relatively wide dynamic range.

Optical auto-focus sensors have been used extensively in optical data storage and compact disc consumer markets as well as providing profilometers for measuring surface roughness and thickness profiles of various articles. Thickness measurements of the article require dimensional change information which is contained in the lower spatial frequencies of the surfaces. Surface profilometry at relatively high resolutions of about 2 $\mu$m has been previously achieved using optical auto-focus sensors used in various configurations but each require the use of a fixed reference plane or a fixed surface for supporting the article.

Typically, previously known optical auto-focus sensors used in profilometry practices are constructed and operate in a manner similar to that described in either the article entitled, "Evaluation of a Commercial Micro topography Sensor," by R. Brodman et al, published in, *In-Process Optical Metrology for Precision Machining*, Proc. Soc. Photo. Instrum. Eng., 802, (1987) pp 165–169, or in the article entitled, "Contact and Non-contact Profilers," by K. Creath et al, published in *Optical Shop Testing*, 2d ed., (John Wiley & Sons) (1992), Chap. 17, pp 696–714. In each of these articles the optical sensors utilize a light beam, such as provided by a laser, which is focused through a movable objective or focus lens onto a specimen surface having specular or diffuse properties so that the reflection of the light beam will be returned along the same path for deflection at the optical axis by a beam splitter. The deflected light beam is then split into two parts by a prism with each half of this deflected light beam being incident upon a discrete bi-cell or double photo diode detector. With the surface of the specimen located at the focal point of the focus lens, the diodes of each detector receives half of reflected light at the same intensity. When the surface of the specimen is shifted or moved in a plane towards or away from the focusing lens such as caused by a change in thickness or the presence of roughness or steps, the concentration of the light beam on the diode pair of the detector correspondingly shifts. The resulting signal from the diode pair defines a focus error signal which can be used to initiate the auto-focus tracking system of the optical sensor for moving the focusing lens to a new focusing position. The extent of this movement of the focusing lens directly corresponds to and provides a measurement of the surface profile of the specimen.

A further article relating to optical auto-focus sensors and entitled "Dynamically Focusing Electro-optical Sensor-System for Microprofilometry", by U. Breitmeier et al, published in *In-Process Optical Metrology for Precision Machining*, SPIE Vo. 802, (1987) pp 170–173, describes the use of the Foucault principle for guiding the reflected light beam for reception by a single photo diode detector. In applying the Foucault principle to the optical auto-focus sensors, the reflected beam after being deflected by the beam splitter is projected passed a "knife" edge which is placed in and normal to the reflected beam at such a location so that when the focusing lens is in focus on the surface of the specimen the reflected light will fall equally on each detector diode. When an out of focus error occurs due to movement of the specimen surface in either direction, the reflected light is also displaced by the "knife" edge in a corresponding direction to increasingly shadow one of the photo diodes with increasing movement of the specimen surface. The sign of the difference in signal strength from the two diodes of the detector and the extent of this difference provides a signal indicative of direction and distance of article surface movement.

The triangulation-based distance measuring systems are typical of the system described in the publicly available catalog *Hamamatsu Technical Data Sheet* entitled, "Optical Displacement Sensors: H3065 Series", Hamamatsu Corporation, Cat. No. KACC1003E01, Bridgewater, N.J. (1991). In a triangulation-type sensor, the light beam from a pulse-driven LED or the like is focused onto the surface of a specimen to be measured through a focusing lens. Light is scattered from the specimen surface and imaged at an known angle so as to be received by a position sensitive detector which provides a signal indicative of the distance to the surface of the specimen. This causes the signal to chang with minute displacements of the specimen surface relative to the sensor. This change of signal is a distance signal provided as an analog voltage and is accurate to about 1 micron.

By using triangulation measuring systems, the sensor head can remain in a fixed position so that any changes in the object or specimen surface with respect to displacement thereof towards the sensor can be measured without repositioning the sensor head or any lens thereof as required in optical auto-focus sensors. Even so, it has been found that the auto-focus approach has an added appeal in that the use of an objective lens with a suitably high N/A, i.e., about 0.55 since resolution is determined by the relationship $0.61\lambda/NA$, provides greater resolving power which can provide surface roughness information that cannot readily be determined by using triangulation systems.

While previously known contact and non-contact measuring mechanisms, such as described above, have been found to be satisfactory for measuring surface profiles such as surface roughness and step discontinuities of an article or specimen having rectangular and cylindrical forms, and to some extent satisfactory for measuring the thickness and variations in the thickness of such an article or specimen, there are still several shortcomings or drawbacks which detract from their acceptance for measuring surface profiles and/or thicknesses of many articles or specimens, especially real time measurements. For example, while LVDTs can be used for measuring specimens having both reflective or nonreflective surfaces, they are linear only over a relatively small range and also must, sometimes undesirably, contact the surface of the specimen. Problems associated with the contacting of the specimen surface with the sensor have been somewhat eliminated by using an optical auto-focus sensor or a triangulation-type optical sensor for specimen measurement purposes. However, in order to accurately provide thickness measurements or surface profiles of any specimen, these optical sensors require that the sample must be placed and maintained in contact with a fixed reference plane or surface. Thus, a serious problem with respect to the accuracy of such measurements occurs when any deflection of the specimen relative to the fixed reference surface since such a deflection would be interpreted as a change in thickness or an indication of surface roughness or other surface conditions so as to provide an erroneous measurement of the surface profile or thickness of the specimen. This shortcoming or problem is of particular significance if it is desired to monitor the thickness or surface profile of a article that is being transported in real time relative to the optical sensor since the movement of the article passed the sensor would inherently introduce deflection of the article and thereby provide erroneous signals indicative of the article thickness and/or surface profile.

SUMMARY OF THE INVENTION

Accordingly, it is an object of the present invention to provide accurate measurements of the total thickness and/or surface profiles of an article or specimen having oppositely facing and substantially parallel surface regions with specular or diffuse surfaces by employing a novel optical caliper provided by two optical profilometry mechanisms disposed in a conjugate relationship. The above measurements are provided without the use of a fixed reference surface, in the presence of any deflection of the specimen in the focusing plane of the profilometry mechanisms, and while the specimen or product is stationery or being moved in a plane generally normal to the profilometry mechanisms such as in real time monitoring of the thickness and surface characteristics of an article being produced by a rolling mill, machining, extrusion, and the like.

Generally, these and other objectives of the present invention are achieved by using a differential arrangement of two optical sensor systems using auto-focus or triangulation principles and disposed in a conjugate relationship whereby surface height changes on opposite sides of the specimen being measured produces two error signals each corresponding substantially to the extent and direction of such changes in each of the two optical sensors. In the present invention the differential of these error signals as provided by an algebraic addition thereof produces a common mode signal which compensates for any deflection of a specimen disposed in a plane between the optical sensors. The balance of the difference signal, if any, provides an accurate measurement of any instantaneous change in specimen thickness including such changes to the surface imperfections such as roughness or steps regardless of any deflection of the specimen in the plane between the two optical sensors. Also, the surface profile on each side of the specimen is determined by the relative strength of the signal from each of the two optical sensors so as to provide for a measurement of the changes or differences in the surface profile from one side of the sample to the other side. By so positioning the two optical sensors with one on each side of the specimen being measured, a physical reference surface is not required since the optical caliper of the present invention measures surface height changes with respect to a virtual reference surface.

The present invention provides for thickness and surface profilometry measurements of products or articles formed of materials having light reflecting surfaces and include materials such as metals, alloys, paper and paper products, ceramics, plastics, and having opposed substantially parallel surface regions. These articles are of a rectangular or cylindrical shape so as to have oppositely facing substantially parallel surfaces of lengths sufficient to be transportable passed the sensor.

The optical caliper of the present invention has a differential conjugate arrangement of optical sensor systems and comprises: first and second optical sensor means respectively supportable in a spatial relationship to first and second oppositely facing and substantially parallel surface regions of an article for projecting focusable light beams towards one another and onto the opposite surface regions of the article and along an essentially common path disposed substantially parallel to the cross-sectional plane of the article, the first and second optical sensor means each comprising light source means for providing the light beams, lens means for focusing each of the light beams on to each of the oppositely facing surface regions at selected locations thereon disposed substantially directly opposite one another, and detector means for receiving the reflection of light beams from each of the surface regions and for producing first and second signals respectively indicative of any change in the spatial relationship of each of the surface regions to the facing optical sensor with the extent and sign of each signal corresponding to the extent and direction of surface height changes in the cross-sectional plane of the article at the selected locations; and, circuit means for providing a third signal corresponding to the differential of the first and second signals to compensate for any displacement of the first and second surface regions in a common direction at the selected locations and with any balance of the third signal and the sign thereof being proportional to the extent and direction of actual changes in the thickness in the article in the cross-sectional plane thereof.

The operation of the optical caliper of the present invention comprises the steps of: projecting first and second light beams towards one another and onto the oppositely facing surface regions of an article being measured, focusing each of the light beams on to each of the opposing surface regions at selected locations thereon disposed substantially directly opposite to one another, providing first and second signals from the reflection of the first and second light beams from the surfaces of the first and second surface regions with said first and second signals being respectively indicative of any change in the focus of first and second light beams means with the sign and extent of change in the focus of the first light beam and the second light beam respectively corresponding to the direction and extent of surface height changes in the cross-sectional plane of the article at the selected locations, providing a third signal corresponding to the differential of the first and second signals to compensate for any displacement of the first and second surface regions in a common direction at the selected locations on the article, and respectively determining with any balance and the sign of the third signal the extent of actual changes of thickness of the article in the cross-sectional plane thereof at the selected locations and the direction of such thickness changes.

By compensating for both the displacement of the first and second surface regions in the common direction and the actual change in the thickness of the article as provided by the third signal, the strength and sign of the first signal and of the second signal after such compensation thereof provide an indication of the extent of any surface height change and the direction thereof in the first surface region and/or the second surface region.

The article or specimen surface profile and thickness measurements are preferably achieved by using optical sensors with automatic focusing of the objective or focusing lens or alternatively, by using triangulation differential optical sensors as described above. Also, the optical caliper of the present invention does not rely on the particular construction of the optical sensors being used for producing the focus error or distance signals as long as the signals are accurately indicative of the relative displacement of the specimen surface with respect to the sensor such as provided by a change of thickness of the specimen or the presence of a surface condition such as roughness. To this end previously known individual optical sensors such as described in the aforementioned publications could be used in the practice of the present invention. Thus, the aforementioned publications are accordingly incorporated herein by reference.

For the purpose of describing the optical caliper of the present invention and its method of operation for accurately measuring surface profiles and thickness of varying samples, the detailed description below is directed to but not limited to the use of optical sensors with automatic focus control as provided by two matched optical auto-focus sensors placed in a conjugate relationship, i.e., facing one another, on opposite sides of the specimen to be measured.

Other and further objects of the present invention will become obvious upon an understanding of the illustrative embodiment and method about to be described or will be indicated in the appended claims, and various advantages not referred to herein will occur to one skilled in the art upon employment of the invention in practice.

A preferred embodiment and method of the invention have been chosen for the purpose of illustration and description. The preferred embodiment illustrated and the method described are not intended to be exhaustive nor to limit the invention to the precise form shown or the method described. The preferred embodiment and method are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

A preferred embodiment of the present invention is shown and described below as being directed to an optical non-contact profilometry system and method provided by an optical caliper with matched differential optical, auto-focus sensors that are arranged conjugate to each other so that the surface profile and/or cross-sectional dimension i.e., the thickness of a stationary or moving (real time) work product, article or specimen can be accurately measured without the need of a fixed reference plane or surface and while the article is deflecting in space within the acquisition range of the optical auto-focus sensors. The output signal of the two matched optical, auto-focus sensors, after differentiation of the focus error signals, is used to produce a measurement of surface profile or cross-sectional thickness of the article that is insensitive to such deflection of the article since the differential of the error signals produces a common mode signal which is indicative of the deflection of the sample relative to each of the optical sensors.

Figure 1:
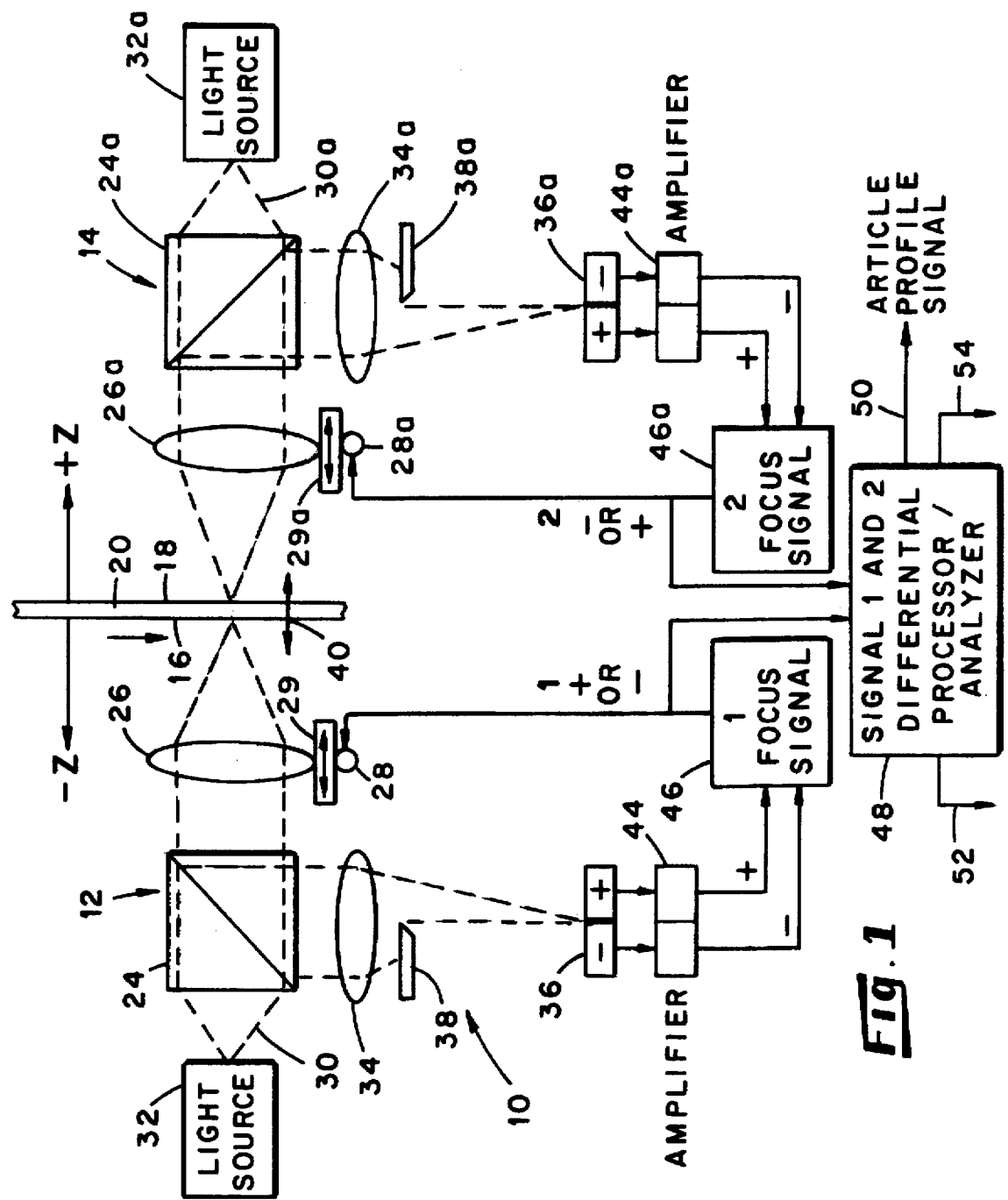
FIG. 1 is a schematic diagram showing the optical caliper of the present invention utilizing two optical auto-focus sensors in a working relationship with a specimen.

In the optical caliper of the present invention as generally shown in FIG. 1 at 10, the optical, auto-focus sensors shown at 12 and 14 are preferably similarly constructed and arranged. Accordingly, the description below pertaining to the components and operation of optical sensor 12 similarly corresponds to description of the components and operation of optical sensor 14 and as such are identified by the same reference numeral followed by the letter "a". The matched auto-focus sensors 12 and 14 are disposed in a facing or conjugate relationship with one another with the opposed optical sensors 12 and 14 respectively focusing on the oppositely facing surface regions 16 and 18 of the article, product, or specimen 20. Each of the optical auto-focus sensors 12 and 14 is usually contained in a suitable housing (not shown) and conventionally comprises a fixed beam splitter 24, a focusing lens 26 located between the beam splitter 24 and the specimen 20 which is positionable along a plane oriented substantially perpendicular to the facing surface 16 region of the specimen 20 by employing a suitable and conventional servo and servo-actuator system such as generally shown at 28. The measurement of the displacement of the focusing lens 26 as provided by the servo system 28 in response to a focus error signal required for refocusing the lens 26 provides a measure of the surface profile or thickness of the specimen 20. This measurement can be provided by using any suitable mechanism capable of analyzing the error signal or the displacement of the lens such as by using an inductive displacement transformer generally shown at 29 coupled to the servo system 28.

A light beam 30 from a suitable light source 32, preferably a linearly polarized light such as provided by a laser diode such as described in the aforementioned references, is directed through the beam splitter 24, preferably a polarizing beam splitter, and focused through lens 26 onto the facing surface region 16 of the specimen 20. The light beam 30 contacting the surface region 16 is reflected back through the focusing lens 26 and into the beam splitter 24 where it is deflected or turned at essentially right angles and directed through a secondary focusing lens 34 onto the surface of a double photo diode or bicell detector shown at 36 which is capable for providing a focus error signal indicative of a shift in the focal point of the focusing lens 26 due to a change in the spatial position of the surface region 16 relative to the focusing lens 26. This focus error signal from the detector 36 is used to reposition and refocus the lens 26 so as to provide a measurement of the surface profile and/or thickness of the specimen 20. For the purpose of the present invention, as will be described below, the optical sensor 14 similarly and simultaneously provides an error signal due to any shift in the focal point of the focusing lens 26a due to a change in the spatial relationship of the surface region 18 of specimen 20 to the focusing lens 26a.

If a polarizing beam splitter (PBS) is employed to direct the maximum amount of light onto the measured surface, linearly polarized light is directed through the PBS such that all of the incident light is allowed to travel in the direction of the measurement surface. A quarter wave plate (QWP) follows the PBS and is so oriented that its fast axis is at an angle of 45 degrees with respect to the incident polarization. The linearly polarized light is converted to circularly polarized light, either right circularly polarized light (RCP) of left circularly polarized light (LCP) For example, with the light converted to RCP, the handedness of the polarization is flipped after reflection so that the RCP becomes LCP which traverses the QWP in the backwards direction and is converted back to linearly polarized light, but rotated 90 degrees with respect to its original orientation. The rotated light impinges onto the PBS and is reflected at 90 degrees with respect to the optical axis, in the direction of the secondary optics used to form the focus error signal.

As noted above, several previously known mechanisms can be used with the optical auto-focus sensor 12 for directing the out of focus signals to the detector 36 and include a beam dividing lens or an obscuration arrangement of focus-error detection which is substantially similar to the above-described Foucault knife-edge technique. In this obscuration arrangement the edge of the knife shown at 38 is placed between the secondary lens 34 and the detector 36. As the surface region 16 (or 18) moves in and out of focus via the lens 26 (or 26a) due to changes in surface profile or thickness of the specimen 20, or due the displacement of the specimen 20 in either the +Z or the −Z direction as indicated by the double ended arrow 40, the light spot focused by the secondary lens 34 onto the surface of the detector 36 moves perpendicular to the edge of the obscuration knife 38. Thus, by using a bicell detector 36 at the focus of the secondary lens 34 the error signal produced by subtracting the outputs of the two detector halves is divided by the sum of the two detector halves so that a normalized output provides the error signal. This error signal is expressed as:

$$error_{focus} = \frac{A-B}{A+B}$$

In this formula the letters A and B refer to each detector half.

Figure 2:
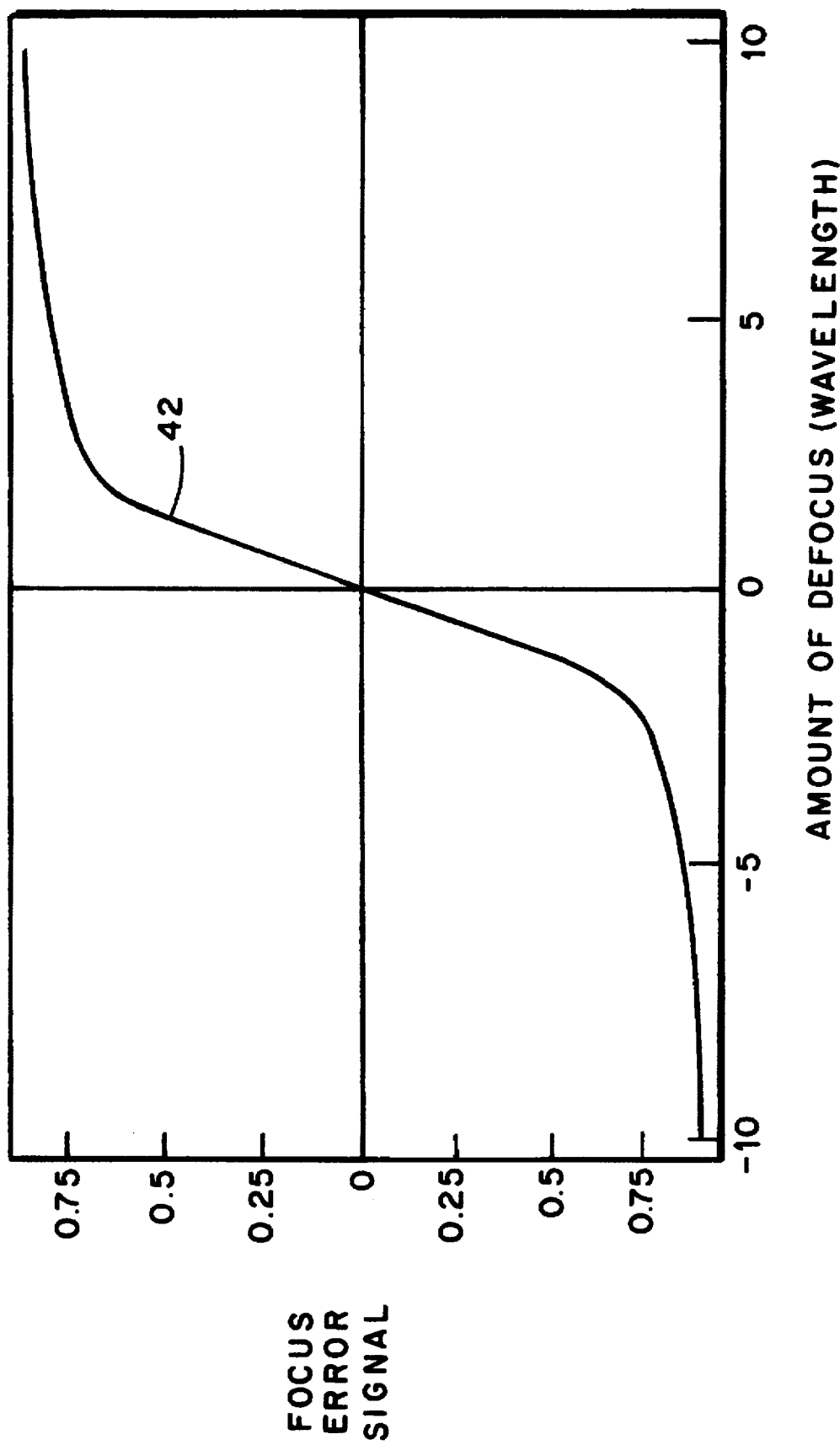
FIG. 2 is a graph illustrating details of the error signal produced in a bicell detector of one optical auto-focus sensor in the optical caliper for auto-focusing the focus lens and for providing a signal corresponding to the displacement of the lens for refocusing the lens due to the focus error signal.

An example of numerical solution of the error signal using an obscuration arrangement for positioning the out of focus signal onto the detector 36 is shown in FIG. 2. This bipolar error signal indicated by line 42 can be generated in a circuit containing suitably closed-loop feedback arrangement (not shown) which includes suitable amplifiers 44 and a focus error-signal measuring mechanism or circuit as generally shown at 46 coupled to the detector 36 and to the lens moving servo system 28. The voltage provided by the error signal is the amount of corrective voltage required to regain focus and is proportional to the change of the surface height of the specimen 20 being measured.

In accordance with the present invention, the optical sensors 12 and 14 of the optical caliper 10 are disposed in a spatial relationship to one another so that the light beams 30 and 30a from the focusing lenses 26 and 26a are focused on the oppositely facing sides or surface regions 16 and 18 of the specimen 20 at spots or locations disposed directly opposite one another in the same cross-sectional plane of the specimen 20. With the light beams of each sensor system 12 and 14 being automatically focused on the opposite sides or surfaces of the work piece 20, the algebraically adding of the focusing error signal (signal 1) of the sensor 12 to the focusing error signal (signal 2) of sensor 14 in a suitable signal algebraic adding circuit or signal differential processor such as a conventional differential instrumentation amplifier, as generally indicated at 48, provides a net error signal 50. Thus, assuming a general right-handed Cartesian coordinate system and with the light propagating from the sensors 12 and 14 along the Z axis onto opposite surface regions of the specimen 20 as shown in FIG. 1, local changes in the surface profile or height of the specimen 20 at the point of focus of the sensors 12 and 14 will be uncorrelated between the opposite surface regions 16 and 18. On the other hand, if the specimen 20 is displaced in the space between the focusing beams 30 and 30a along the Z axis, the algebraic addition of the error signals derived from the detectors 36 and 36a of the sensors 12 and 14 in the signal adding circuit or processor 48 provides a common mode signal with a zero output signal which corresponds to a net thickness change of zero so as to exactly compensate for the displacement of the specimen 20. This arrangement effectively removes any requirement that the specimen 20 be maintained in a specific position relative to a reference surface as required of the previously known optical and other measuring systems.

In a typical measurement of an article thickness with the optical caliper 10 of the present invention, a standard or reference surface (not shown) such as provided by a flat sheet is temporarily placed between the sensors 12 and 14 in a plane normal to the light beams 30 and 30a. The autofocusing of lens 26 and 26a is then acquired on the opposite sides of the reference surface. This step is necessary to set the actuators for the servo systems 28 and 28a at the midpoint of their travel. The reference surface is than removed and the light beams 30 or 30a is allowed to fall onto its conjugate sensor. Each lens 26 and 26a is now focused onto a virtual surface in space that bisects the absent physical reference surface. The specimen 20 in the form of sheet stock is now allowed to advance in the plane lying between both light beams 30 and 30a and when these light beams are interrupted, each sensor 12 and 14 must re-acquire focus on the facing side of the specimen 20. By suitably calibrating the sensors 12 and 14 with the reference surface, the correction voltage now required to achieve focus on each side of the specimen 20 is proportional to the thickness of the specimen 20. As the specimen 20 is advanced further and changes in surface height of the specimen occurs, each sensor 12 and 14 dynamically changes its focal position to remain in focus on its facing surface of the specimen 20, and the error voltage maps the surface height variations on each facing surface. By allowing both the focus of sensors to "float", the specimen 20 can move in space in the Z plane, but such movement will not be interpreted as a thickness change of the specimen 20 since this is a common-mode signal provided in the differential thickness measurement by the optical caliper 10.

The balance and the sign of the error signals after the differentiation thereof provides the output signal 50, the strength and sign of which is proportional to the changes the specimen thickness and the direction of such changes. Signals 52 and 54 derived from the signal adding circuit or processor 48 are the focus error signals from the optical sensors 12 and 14, respectively, after they are each compensated for with respect to both the displacement of the first and second surface regions in the common direction and the actual change in the thickness of the article as provided by the third signal. Thus, the strength and sign of the each of the signals 52 and 54 are proportional to the extent of any surface height change and the direction thereof in the first surface region and on the second surface region, so as provide a measurement of how much and in what direction the height of each surface of the specimen 20 is changing. To provide this function, the signal adding circuit or processor 48 may be provided with or coupled to a signal compensating or analyzing circuit such as a suitably programmed microprocessor.

In practice, it is expected that the user, in some instances, can operate the optical caliper 10 in an open-loop mode and simply monitor the focus error voltage without applying any correction to the objective or focusing lens but, in such instances, the specimen surfaces would have to remain within the linear portion of the focus error curve which is usually about ±10 μm. It is also expected that a linear range could be designed by using an astigmatic focus error method and varying the distance between the astigmatic loci so as to have a tradeoff of resolution versus dynamic range. By electronically filtering the output of the error voltage, the user can select what band of spatial frequencies are of interest, i.e., dimensional data, surface roughness, or both.

When high frequency changes in the surface height are small compared to the absolute thickness of the specimen under study, the servo systems 28 and 28a for focusing lens 26 and 26a can each be split between a relatively high speed, small-travel servo-actuator mechanism and a low speed large servo travel actuator mechanism so as to provide both coarse and fine actuators for the servo systems 28 and 28a. For such applications, commercially available piezoelectric actuators with an internal feedback circuit for closed-loop motion control and capable of servo travel ranges of 100 μm at bandwidths in the range of about 0 to 200 Hz can be used for small travel while a DC-motor with closed loop linear stages can be used for the coarse, large-travel positioning of the focusing lens 26 and 26a. Such a piezoelectric actuator is the P/N P-720.00 Piezoelectric Microscope Focusing actuator from Physik Instrumente and distributed in the United States by Polytec Optronics, Costa Mesa, Calif. 92626.

It will be seen that two optical sensors as used in a triangulation measuring technique can be arranged in a conjugate relationship with one another as with the above described optical auto-focus sensors and will provide similar measuring results whereby any deflection of the article or specimen being measured relative to the sensors provides a common mode signal which produces no output signal from the sensors and which is the desired response so as to compensate for the displacement of the deflection of the specimen in a Z plane between the sensors. Thus, it is believed that the present invention provide novel optical calipers capable of accurately measuring the surface profile and the thickness of any article having substantially parallel surface regions whether such measurement occurs real time such as in a production line or when the finished article or specimen is merely positioned between the opposing sensors.

What is claimed is:

1. An optical caliper defined by a differential conjugate arrangement of optical sensor systems and comprising:

first and second optical sensor means respectively supportable in a spatial relationship to first and second oppositely facing and substantially parallel surface regions of an article positionable in the space between the first and second optical means for projecting focusable light beams towards one another for sequentially establishing a first focus on a virtual surface in said space and then establishing a second focus on the oppositely facing surface regions of the article and along an essentially common path disposed substantially parallel to the cross-sectional plane of the article with the extent of positional change between the first focus and the second focus being indicative of the thickness of the article at said cross-sectional plane, the first and second optical sensor means each comprising light source means for providing the light beams, lens means for focusing each of the light beams onto the virtual surface and each of the oppositely facing surface regions at selected locations thereon disposed substantially directly opposite one another, and detector means for receiving the reflection of light beams from each of the surface regions and for producing first and second signals respectively indicative of any change in the spatial relationship of each of the surface regions to the facing optical sensor means with the extent and sign of each signal corresponding to the extent and direction of surface height changes in the cross-sectional plane of the article at the selected locations; and, signal adding circuit means adapted to receive and algebraically add the first and second signals for providing a third signal corresponding to the differential of the first and second signals to compensate for any displacement of the first and second surface regions in a common direction at the selected locations and with any balance of the third signal and the sign thereof being proportional to the extent and direction of actual changes in the thickness in the article in the cross-sectional plane thereof.

2. An optical caliper as claimed in claim 1, wherein said first and second optical sensor means are of a substantially similar construction and operate in a substantially similar manner.

3. An optical caliper as claimed in claim 1, wherein signal compensating means are adapted to receive the first signal and the second signal for effecting the compensation thereof with respect to both said displacement of the first and second surface regions and said actual changes in the thickness of the article and thereby providing fourth and fifth signals indicative of the extent of any surface height change and the direction thereof in the first surface region and in the second surface region.

4. An optical caliper as claimed in claim 1, wherein said change in the spatial relationship causes at least one of the first and second optical sensors to become unfocused for producing at least one of the first and second signals, wherein a lens moving means is coupled to said lens means in the first optical sensor and in the second optical sensor for sufficiently displacing the lens means therein in response to one of the first and second signals for respectively refocusing the lens means in at least one said first and second optical sensors.

5. An optical caliper as claimed in claim 1, wherein the first or second optical sensors utilize one of an auto-focus system and a triangulation system for generating the first and second signals.

6. An optical method for determining and measuring variations in the thickness in the cross section of a substantially planar article having opposing essentially parallel first and second surface regions with specular or diffuse light-reflecting surfaces while compensating for deflections of the article in a plane oriented generally orthogonal to the first and second surface regions of said article, said method comprising the steps of:

projecting first and second conjugate light beams though space towards one another and focusing the light beams on a virtual surface in said space;

positioning the article in said space;

thereafter projecting the first and second light beams towards one another and onto the oppositely facing surface regions of an article being measured;

focusing each of the light beams onto each of the opposing first and second surface regions at selected locations thereon disposed substantially directly opposite to one another with the extent of positional change between the focusing of the light beams on the virtual surface and the focusing of the light beams on the surfaces of the first and second surface regions of the article being proportional to the thickness of the article in the cross-sectional plane;

providing first and second signals from the reflection of the first and second light beams from the surfaces of the first and second surface regions with said first and second signals being respectively indicative of any change in the focus of first and second light beams means with the sign and extent of change in the focus of the first light beam and the second light beam respectively corresponding to the direction and extent of surface height changes in the cross-sectional plane of the article at the selected locations;

algebraically adding the first and second signals for providing a third signal corresponding to the differential of the first and second signals to compensate for any concurrent displacement of the first and second surface regions in a common direction at the selected locations on the article; and, respectively determining with any balance and the sign of the third signal the extent of actual changes of thickness of the article in the cross-sectional plane thereof at the selected locations and the direction of such thickness changes.

7. An optical method as claimed in claim 6, including the additional step of treating the first and second signals by compensating for both said displacement of the first and second surface regions and said actual changes in the thickness of the article for providing fourth and fifth signals, and wherein the strength and sign of each of the fourth and fifth signals are indicative of the extent of any surface height change and the direction thereof in the first surface region and in the second surface region.

* * * * *